United States Patent [19]

Stouffer et al.

[11] 4,097,003
[45] Jun. 27, 1978

[54] CONSTANT PULL SAFETY BELT RETRACTING MECHANISM

[75] Inventors: Richard C. Stouffer, Auburn Heights; Jerome W. Schotthoefer, New Baltimore, both of Mich.

[73] Assignee: Allied Chemical Corporation, Morris Township, N.J.

[21] Appl. No.: 763,779

[22] Filed: Jan. 31, 1977

[51] Int. Cl.² .................. A62B 35/02; B65H 75/48
[52] U.S. Cl. ........................... 242/107; 242/107.4 R
[58] Field of Search ........................ 242/107–107.7; 297/388; 280/744–747; 185/37, 39

[56] References Cited

U.S. PATENT DOCUMENTS 4,036,449  7/1977  Schreiber ........................ 242/107

Primary Examiner—Harvey C. Hornsby
Assistant Examiner—John M. Jillions
Attorney, Agent, or Firm—Roger H. Criss; Patrick L. Henry

[57] ABSTRACT

A safety belt retracting mechanism having constant pull includes a spindle supporting a rotatable spool for storing the belt within a housing. A conventional, positive coefficient of force spring inside the housing applies a retracting force to the spool and belt as the belt is pulled by the occupant. The spring is coupled between the housing and spool to a gear train having a negative coefficient of force transfer characteristic. The negative transfer characteristic of the gear train is caused by a changing gear ratio which compensates for the positive force characteristic of the spring to provide constant pull to the belt. The changing gear ratio is produced by a spiral-shaped gear coupled to a constant radius pinion formed on one end of the spindle. The spiral-shaped gear is formed on the hub of a containment member enclosing the spring. The containment member is mounted to the housing on a pivot arm. The arm is resiliently biased by a spring to maintain the spiral-shaped gear in enmeshment with the pinion during gear rotation.

7 Claims, 6 Drawing Figures

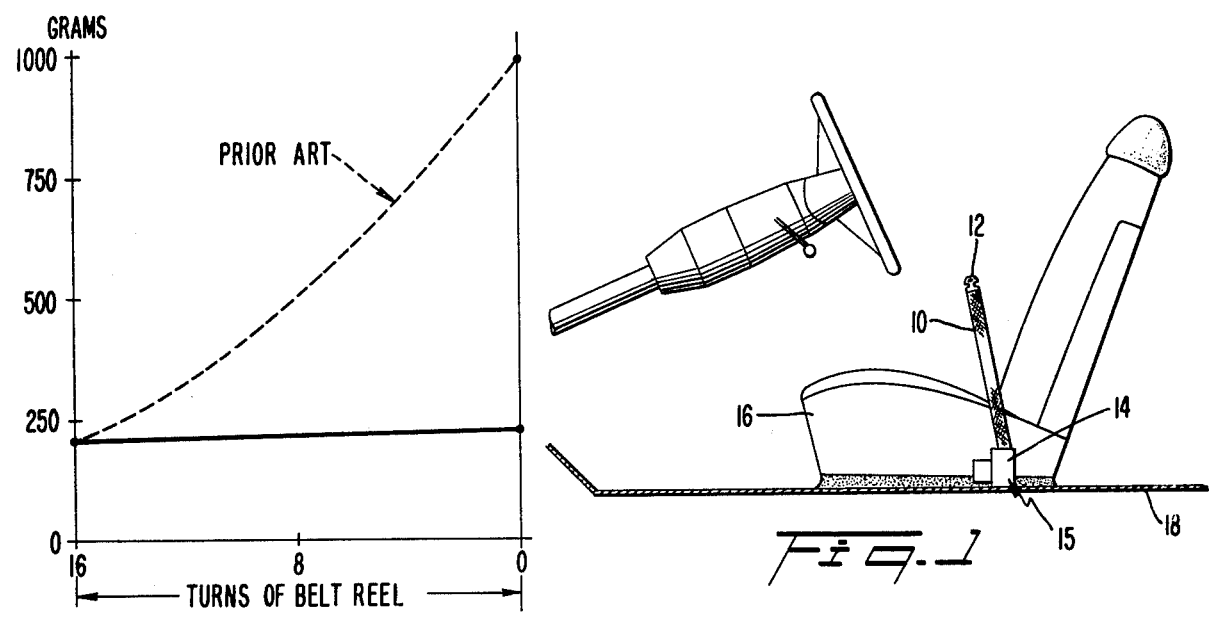
Fig. 1
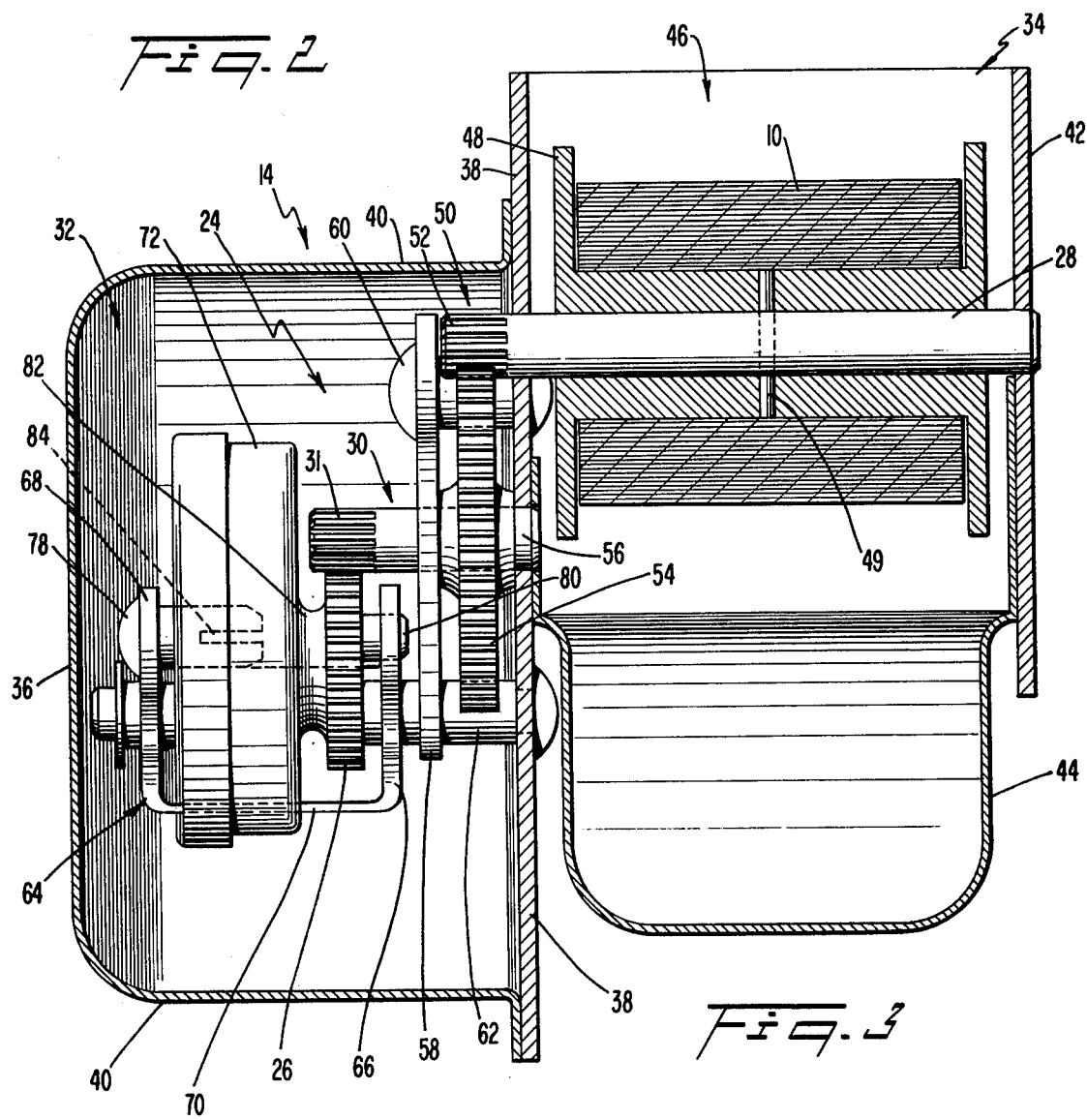
Fig. 2
Fig. 3

4,097,003

CONSTANT PULL SAFETY BELT RETRACTING MECHANISM

BACKGROUND OF THE INVENTION

The present invention relates generally to vehicle safety seat belt retractors, and more particularly, to constant force retractors which provide a substantially constant force to a lap or shoulder belt between the home (fully retracted) and fully extended positions.

In order to protect the occupants of a vehicle such as an automobile from injury during collision, turn-over, or excessive vehicle acceleration or deceleration, a safety belt is generally provided for each occupant of the vehicle. Each safety belt includes a shoulder belt that extends across the shoulder and chest of the occupant to protect against whiplash, and a lap belt that extends across the lap to retain the occupant in his seat. The lap and shoulder belts are retracted in a housing on separate reels when not in use by coil springs inside the housing. When seated, the occupant withdraws the lap and shoulder belts from the reels by grasping the exposed ends of the belts, and pulling outwardly, swinging the belts around the body for engagement with buckle elements of cooperating belt sections secured to the floorboard of the vehicle.

The spring for retracting each safety belt is typically a coil type spring that has a positive coefficient of force characteristic, i.e., the pull of the spring is proportional to spring deflection. As a result, pull on the belt tends to increase as the belt is withdrawn from the housing on the reel. The pull is minimum with the belt fully retracted and is maximum with the belt fully extended.

The spring must be heavy enough to fully retract the belt into the housing so that the belt is out-of-sight when not in use. On the other hand, the pull should not be excessive with the belt fully extended because pressure against the shoulders and lap of the occupant causes discomfort. Furthermore, the belt is difficult to pay out against the increasing retracting force or pull provided by the spring. The discomfort caused by the excessive retracting force of the belt, and difficulty in payout discourage use of safety belts with accompanying increases in occupant injuries and deaths.

Accordingly, one object of the invention is to provide a safety belt retractor that exerts a pull on the belt that is constant between the fully retracted and fully extended belt positions.

In application Ser. No. 667,222, filed Mar. 16, 1976, to Schottoefer, assigned to the Assignee of the present invention, the retraction spring inside the reel housing of a safety belt retractor is continuously or stepwise tapered along the length of the spring to exert constant pull to the belt as the belt is protracted from the reel housing. While the tapered spring arrangement functions satisfactorily, the spring must be specially manufactured, and the narrow portions of the spring are somewhat prone to breakage.

An additional object of the invention, therefore, is to provide a new and improved safety belt retractor having constant retracting force that is durable and uses a standard helical coil spring.

SUMMARY OF THE INVENTION

In accordance with the invention, a constant pull safety belt retracting mechanism comprises a spool mounted to a spindle that is journalled on a housing. The spool is adapted to receive the safety belt in helical wrap, and is rotatable in a winding direction to retract the belt into the housing, and in an opposite unwinding direction. The belt is withdrawn by manually protracting the belt from the housing located on one side of the occupant. This causes the spool to rotate in the unwinding direction until the free end is in position for buckling to a corresponding buckle receiving member. The buckle receiving member is secured to the floorboard on the opposite side of the occupant.

A conventional, positive coefficient of force characteristic spring located in the housing is coupled between the housing and spindle through a gear train that produces a negative coefficient of force transfer characteristic. As the belt is protracted from the housing, the retracting force or pull produced by the spring continuously increases between the home (fully retracted) and fully protracted positions of the belt. The continuously increasing spring force is compensated for by the negative coefficient of force transfer characteristic of the gear train resulting in approximately constant pull on the belt. The negative transfer characteristic of the gear train is caused by a gear ratio that changes during belt protraction.

The housing comprises a first enclosed compartment, and a second open-ended compartment. The gear train is located inside the enclosed compartment to protect the gear train from damage caused by foreign particles. The spool is located in the open-ended compartment for access to the belt.

The gear train includes a spiral-shaped gear for coupling the spring to the spindle. One end of the spindle is formed with a pinion gear. The pinion gear and spiral-shaped gear are coupled together through a spur and pinion gear member. The effective radius of the spiral-shaped gear, defined as the distance between the shaft of the spiral-shaped gear and its rim, varies as a function of angle. The force transfer gear ratio between the spiral-shaped gear and pinion decreases as the belt is protracted by the occupant, producing the negative coefficient of force transfer characteristic.

The spring is located inside a containment member within the housing. The containment member is pivotally supported in the housing on a U-shaped bracket, and has a hub on which is formed the spiral-shaped gear. As the position of the containment member yields to a changing effective radius of the spiral-shaped gear during rotation, a second spring inside the housing biases the bracket to maintain the spiral-shaped gear coupled to the pinion.

Still other objects, advantages and features of the present invention will become readily apparent to those skilled in the art from the following detailed description wherein we have shown and described only the preferred embodiment of the invention, simply by way of illustration of the best modes contemplated by us of carrying out our invention. As will be realized, the invention is capable of other and different enbodiments, and its several details are capable of modifications in various obvious respects, all without departing from the invention. Accordingly, the drawings and description are to be regarded as illustrative in nature, and not as restrictive.

BRIEF DESCRIPTION OF THE DRAWINGS

FIG. 1 is a side view of the passenger compartment of a vehicle illustrating the constant pull retractor mechanism of the present invention;

FIG. 2 is a graph illustrating the belt retraction force as a function of revolutions of the belt in connection with a prior art retractor as well as with the present invention;

FIG. 3 is a cross-sectional side view of the retractor showing the variable ratio gear train and belt spool in accordance with the present invention;

DETAILED DESCRIPTION OF A PREFERRED EMBODIMENT

Figure 4:
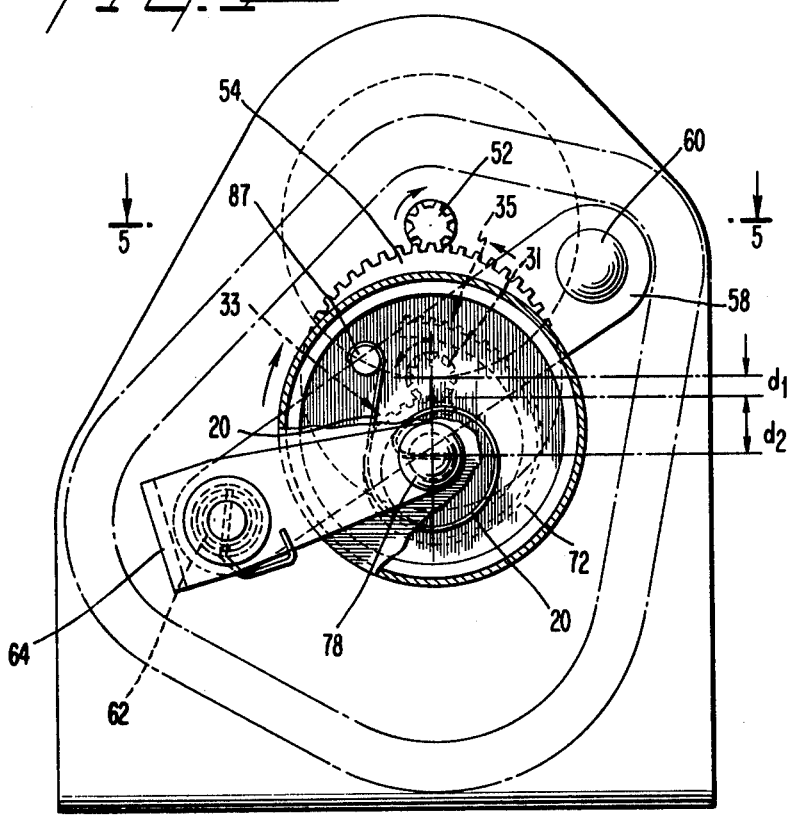
FIG. 4 is a cross-sectional end view of a portion of the retractor showing the positive coefficient of force spring.

Referring to FIG. 1, an occupant restraining belt 10 having a buckle member 12 at one end thereof is protracted from housing 14 of a constant pull safety belt retractor 15 in accordance with the invention. Although not shown, when not in use, the belt 10 is fully retracted in a home position under force of a spring 20 inside housing 14. When the occupant takes his position on seat 16, the occupant withdraws the belt from the retractor 15 on his left and couples the buckle member 12 to a receiver (not shown) on his right secured to the floorboard 18. The length of belt 10 is preadjusted using a preadjustment member (not shown) on the belt 10 itself or is adjusted automatically by a conventional one-way clutch. In the latter, the length of the belt 10 is held with a pawl and ratchet arrangement inside the housing in an occupant restraining mode, but the belt is released in a non-restraining mode. The retracting mechanism 15 may switch between the occupant restraining and non-restraining modes using an inertial locking system such as the one described in U.S. Pat. No. 3,858,824 to Stephenson, assigned to the common assignee. As the belt 10 is pulled from belt retractor 15, a retracting force or pull is applied to the belt by spring 20 in order to return the belt to the retractor when the belt is unbuckled or slackened.

Spring 20 is formed of prestressed, spring steel and has a positive coefficient of force characteristic, that is, as the spring is deflected, the restoring force increases monotonically. As a result, the pull of spring 20 is minimum when the belt is in its fully retracted or "home" position, and is maximum when the belt is fully protracted.

Referring generally to FIG. 3, a variable gear ratio gear train 24, inside the housing 14 of retractor 15 produces a negative coefficient of force transfer characteristic to provide constant pull to belt 10. Without the negative characteristic of gear train 24, the belt 10 would be difficult to pull in the region of maximum protraction making the buckle member 12 difficult to couple to the buckle receiver (not shown). Also, the relatively strong retraction force on the belt in the fully protracted position would cause discomfort to the occupant (compare the dotted line representing a prior art retractor in FIG. 2 with the solid line representing the present invention).

Figure 6:
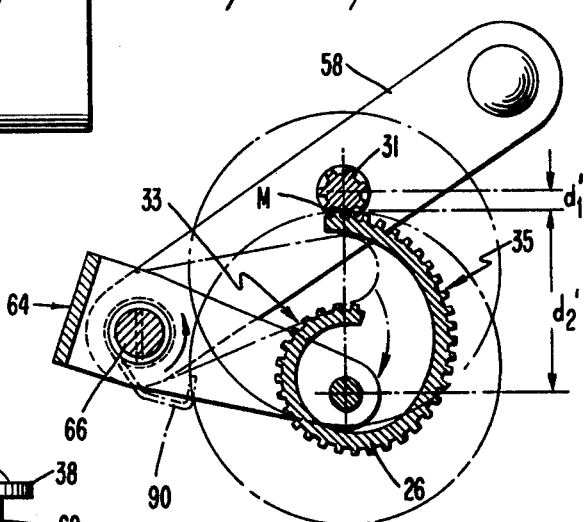
FIG. 6 is a schematic illustration of a portion of the retractor showing the orientation of the spiral-shaped gear when the safety belt is fully protracted.

Referring now to FIGS. 3-6, variable gear ratio gear train 24, in accordance with a preferred embodiment of the invention, produces the negative coefficient of force transfer characteristic with a spiral-shaped gear 26 coupled to a belt spool 48 through a spur and pinion gear member 30. The spiral-shaped gear 26, meshing with a constant radius pinion 31 of member 30, has a radius that changes continuously along its rim, as best seen in FIG. 6. Spiral-shaped gear 26 thus produces a continuously changing gear ratio with pinion 31 as the belt 10 is retracted or protracted, as described in detail below.

Referring to FIG. 3, housing 14, which is formed of a suitable sheet metal material, includes a first, enclosed compartment 32, and a second, open-ended compartment 34. The enclosed compartment 32 is defined by upstanding walls 36 and 38 joined together by a contoured side wall 40. Gear train 24 is located inside enclosed compartment 32 to prevent any damage to the train by foreign matter.

Compartment 34 contains belt 10 stored in helical wrap and is defined by upstanding walls 38 and 42 (wall 38 is common to compartments 32 and 34). The lower end of compartment 34 is enclosed by a shroud 44 and the upper end 46 is open for access to the belt 10. The spindle 28 is journalled on walls 38 and 42 and is rotatable in a winding direction, as well as in an opposite unwinding direction. A spool 48 is mounted on spindle 28 and secured thereto by a pin 49 so that the spool and spindle rotate together. Belt 10 is stored on spool 48 in helical wrap and is withdrawn by the occupant through open end 46.

One end of spindle 28 extending through wall 38 into compartment 32 is formed with a pinion 52. The pinion 52 is coupled to drive train 24 at spur gear 54 of the spur and pinion gear member 30. Shaft 56 of the member 30 is journalled on stationary arm 58 and wall 38. The arm 58 itself is supported to the wall 38 by pins 60 and 62.

Figure 5:
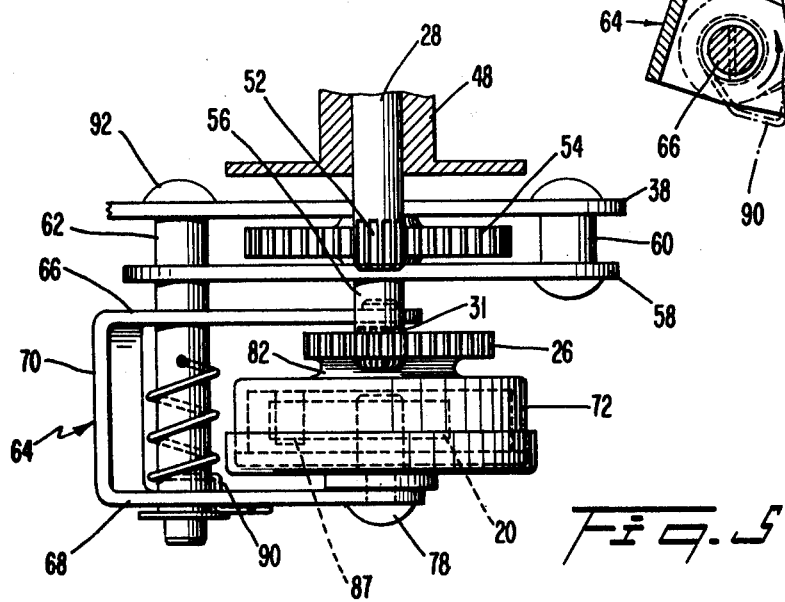
FIG. 5 is a cross-sectional top view of a portion of the retractor showing the spring encasement member and the spiral-shaped gear.

Also supported to wall 38 by the pin 62 is a U-shaped bracket 64 (see FIGS. 3 and 5). Bracket 64 comprises a pair of parallel arms 66 and 68 joined together by a base 70. Located between the arms 66 and 68 is an encasement 72 which houses positive coefficient of force spring 20 (see also FIG. 4) that supplies the retracting force or pull to spindle 28 for retracting belt 10 on spool 48.

The encasement 72 is journalled on pin 78 passing through arm 68 of bracket 70 and on another pin 80 (see FIG. 3) passing through the arm 66. Pins 78 and 80 support the encasement 72 at the center of rotation thereof.

Spiral-shaped gear 26 is formed on a hub 82 of encasement 72. The hub 82 is secured to the center of rotation of encasement 72, but spiral-shaped gear 26 is somewhat offset from the center, as shown in FIG. 5.

The pin 78, secured to arm 68 of the U-shaped bracket 64, contains an axial slot 84, as shown in FIG. 3. One end of the positive coefficient of force spring 20 is seated in the slot 84 of pin 78 within encasement 72; the opposite end of the spring is hooked around a button 87 secured to the encasement 72 (see FIG. 4). It can thus be appreciated that spring 20 is wound by rotating encasement 72 as shown in FIG. 4 counterclockwise, and is unwound by rotating the encasement clockwise.

The effective radius of spiral-shaped gear 26, defined as the distance from the center of pin 80 to a point of enmeshment M between the rim of spiral-shaped gear 26 and pinion 31, continuously decreases during counterclockwise rotation of the gear 26 and increases during clockwise rotation. During rotation of spiral-shaped gear 26, bracket 64 is biased upwardly by coil spring 90 in order to maintain the spiral-shaped gear in enmeshment with the pinion 31. The spring 90 is connected between arm 68 of bracket 64 and the shank of pin 62 welded to upstanding wall 38. Accordingly, the spring 90 applies a counterclockwise force to the bracket 64, as shown by the arrow in FIG. 6, tending to maintain spiral-shaped gear 26 in enmeshment with the pinion 31 at any angle of rotation of the gear 26.

When belt 10 is fully retracted, pinion 31 meshes with the spiral-shaped gear 26 at a small radius rim portion 33 of the gear. Bracket 64 is biased upwardly by spring 90 to an uppermost position, as shown in FIG. 4. The small radius rim portion 33 of spiral-shaped gear 26 in enmeshment with pinion 31 produces relatively high force transfer therebetween, and consequently, relatively high transfer of force between spring 20 and spindle 28. The spring 20, however, is in a condition of minimum stress in encasement 72, and just enough force is coupled to spindle 28 to retain the belt 10 retracted within housing 14.

As belt 10 is retracted from housing 14 by the occupant, pinion 52 of spindle 28 is rotated clockwise (see arrows in FIG. 4) causing spur gear 54 and pinion 31 to rotate counterclockwise. Pinion 31 in turn causes spiral-shaped gear 26 to rotate clockwise winding spring 20.

During clockwise rotation of spiral-shaped gear 26, the point of enmeshment M (see FIG. 6) between the spiral-shaped gear and pinion 31 travels along the rim of the spiral-shaped gear from the small radius rim portion 33, as shown in FIG. 4, toward a larger radius rim portion 35. During the clockwise rotation of the spiral-shaped gear 26, bracket 64 pivots counterclockwise away from pinion 31 against the force of spring 90 as the bracket yields to the increasing effective radius of the spiral-shaped gear 26. The spring 90, biasing the bracket clockwise, as shown in FIG. 6, retains the spiral-shaped gear in enmeshment with pinion 31.

In the larger radius rim portion 35 of spiral-shaped gear 26, force transfer between the spiral-shaped gear and pinion 31 of spindle 28 is minimum. In the region of maximum protraction of the belt 10 corresponding to the larger radius rim portion 35, on the other hand, the retracting force produced by spring 20 is larger than it is elsewhere. Accordingly, the lower transfer of force between the spiral-shaped gear 26 and pinion 31 compensates for the higher magnitude retracting force of spring 20, and the composite retracting force applied to belt 10 is approximately constant between the fully retracted and fully protracted belt positions, as shown by the solid line in FIG. 2.

Stated more precisely, the gear ratio of the pinion 31 and spiral-shaped gear 26 is defined as the ratio of delivered to applied forces, or alternatively, the ratio of the angular speeds of the driving and driven members. The force transfer gear ratio is proportional to the distance ratios $d_1/d_2$ (FIG. 4) and $d_1'/d_2'$ (FIG. 6). During clockwise rotation of the spiral-shaped gear 26 during protraction of belt 10 by the occupant, the distance $d_1$ remains constant because pinion 31 has a constant radius so that $d_1 = d_1'$. The distance $d_2$, on the other hand, increases in magnitude from $d_2$, as shown in FIG. 2, to $d_2'$, as shown in FIG. 6. The force transfer gear ratio and thus the transfer of force between spring 20 and spindle 28 accordingly decreases. The decreasing force transfer characteristic of the spiral-shaped gear 26 and pinion 31 compensates for the positive force characteristic of the spring. The resulting composite retracting force or pull on belt 10 is approximately constant, as aforementioned (see FIG. 2).

In this disclosure, there is shown and described only the preferred embodiment of the invention, but, as aforementioned, it is to be understood that the invention is capable of use in various other combinations and environments and is capable of changes or modifications within the scope of the inventive concept as expressed herein. For example, although the principles of this invention have been described in the specification in connection with a lap belt, it is apparent that the principles could also be applied in connection with a shoulder belt.

What is claimed is:

1. In a vehicle safety system including a safety belt adapted to restrain an occupant in position on a seat, a safety belt constant pull retracting mechanism comprising:

a housing;

a spindle journalled on said housing and adapted to receive said safety belt in helical wrap, said spindle being rotatable in a winding direction and in an opposite, unwinding direction;

positive force coefficient characteristic biasing means for biasing said spindle to rotate in the winding direction; and a spiral-shaped gear for coupling said biasing means to said spindle;

an end of said spindle including a first pinion having a constant radius, and means for coupling said spiral-shaped gear to said first pinion;

a decreasing gear ratio established between said spiral-shaped gear and said first pinion during protraction of said belt producing a negative coefficient of force characteristic to compensate for the positive characteristic of said biasing means, a resulting pull applied to the belt thereby being approximately constant as the belt is protracted from said housing; and second biasing means biasing said spiral-shaped gear and said first pinion in enmeshment.

2. The mechanism of claim 1, wherein said coupling means includes spur and pinion means, said spur and pinion means meshing with said spiral-shaped gear and said first pinion.

3. The mechanism of claim 2, wherein said biasing means is connected between said housing and said spiral-shaped gear.

4. The mechanism of claim 3, wherein said biasing means is disposed within a containment member, said spiral-shaped gear being mounted on said containment member.

5. The mechanism of claim 4, including an arm pivotally connected to said containment member, said arm permitting the position of said containment member to follow a profile of said spiral-shaped gear during protraction of said belt.

6. The mechanism of claim 5, wherein said second biasing means comprises a second spring for biasing said arm to maintain said sprial-shaped gear and said first pinion in enmeshment.

7. In a vehicle safety system including a safety belt adapted to restrain an occupant in position on a seat, a safety belt constant pull retracting mechanism comprising:

a housing;

a spindle journalled on said housing and adapted to receive said safety belt in helical wrap, said spindle being rotatable in a winding direction and in an opposite, unwinding direction;

positive force coefficient characteristic biasing means for biasing said spindle to rotate in the winding direction;

a spiral-shaped gear for coupling said biasing means to said spindle;

an end of said spindle including a first pinion having a constant radius, and means for coupling said spiral-shaped gear to said first pinion;

a decreasing gear ratio established between said spiral-shaped gear and said first pinion during protraction of said belt producing a negative coefficient of force characteristic to compensate for the positive characteristic of said biasing means, a resulting pull applied to the belt thereby being approximately constant as the belt is protracted from said housing;

said coupling means including spur and pinion means, said spur and pinion means meshing with said spiral-shaped gear and said first pinion, said biasing means being connected between said housing and said spiral-shaped gear, said biasing means being disposed within a containment member and said spiral-shaped gear being mounted on said containment member; and an arm pivotally connected to said containment member, said arm permitting the position of said containment member to follow a profile of said spiral-shaped gear during protraction of said belt.

* * * * *